United States Patent
Seong (10) Patent No.: US 10,741,294 B2
(45) Date of Patent: Aug. 11, 2020

(54) POROUS COOLING BLOCK FOR COOLING CORIUM AND CORIUM COOLING APPARATUS INCLUDING SAME, AND CORIUM COOLING METHOD USING SAME

(71) Applicant: RETECH CO., LTD., Hwaseong-Si, Gyeonggi-Do (KR)

(72) Inventor: Ho Je Seong, Yongin-Si (KR)

(73) Assignee: RETECH CO., LTD. (KR)

( * ) Notice: Subject to any disclaimer, the term of this patent is extended or adjusted under 35 U.S.C. 154(b) by 568 days.

(21) Appl. No.: 15/323,416

(22) PCT Filed: Jun. 30, 2015

(86) PCT No.: PCT/KR2015/006702
§ 371 (c)(1),
(2) Date: Dec. 31, 2016

(87) PCT Pub. No.: WO2016/003159
PCT Pub. Date: Jan. 7, 2016

(65) Prior Publication Data
US 2017/0154692 A1    Jun. 1, 2017

(30) Foreign Application Priority Data
Jul. 4, 2014    (KR) .................. 10-2014-0083596

(51) Int. Cl.
*G21C 9/016*    (2006.01)
*G21C 15/18*    (2006.01)
(Continued)

(52) U.S. Cl.
CPC .............. *G21C 15/18* (2013.01); *C04B 38/00* (2013.01); *G21C 9/016* (2013.01); *G21C 15/182* (2013.01); *G21C 15/28* (2013.01); *Y02E 30/40* (2013.01)

(58) Field of Classification Search
CPC ...................................................... G21C 9/016
See application file for complete search history.

(56) References Cited

U.S. PATENT DOCUMENTS

| 4,650,642 A | 3/1987 | Gluekler et al. |
| 6,658,077 B2 | 12/2003 | Alsmeyer et al. |

(Continued)

FOREIGN PATENT DOCUMENTS

| CN | 1185228 A | 6/1998 |
| DE | 4032736 A1 | 4/1992 |

(Continued)

OTHER PUBLICATIONS

Written Opinion for PCT/KR2015/006702, dated Oct. 7, 2015.
International Search Report for PCT/KR2015/006702, dated Oct. 7, 2015.

*Primary Examiner* — Lily C Garner
(74) *Attorney, Agent, or Firm* — Renaissance IP Law Group LLP (57) ABSTRACT

The present invention provides a porous cooling block for cooling corium, comprising: a base part that includes a plurality of pores; a plurality of porous cooling blocks that include a channel part that communicates with some of the plurality of pores of the base part; a sacrificial part that covers the exposed upper surfaces of the porous cooling blocks; and a cooling-water supply unit that supplies cooling water to the porous cooling blocks. Corium is cooled by using steam or cooling water discharged from the porous cooling blocks. Therefore, the corium can be cooled and solidified in the shape of a porous form. Further, the cooling water is uniformly supplied to one surface formed by the cooling block on the whole, thereby easily cooling the corium.

11 Claims, 8 Drawing Sheets

(51) Int. Cl.
　　　*C04B 38/00*　　　(2006.01)
　　　*G21C 15/28*　　　(2006.01)

(56) References Cited

U.S. PATENT DOCUMENTS

| | | | | |
|---|---|---|---|---|
| 7,949,084 | B2 * | 5/2011 | Song | G21C 9/016 |
| | | | | 376/280 |
| 8,537,959 | B2 * | 9/2013 | Akinaga | G21C 9/016 |
| | | | | 376/277 |
| 9,378,854 | B2 * | 6/2016 | Kurita | G21C 9/016 |
| 2002/0044622 | A1 * | 4/2002 | Alsmeyer | G21C 9/016 |
| | | | | 376/280 |
| 2012/0300893 | A1 | 11/2012 | Kurita et al. | |

FOREIGN PATENT DOCUMENTS

| | | | |
|---|---|---|---|
| JP | 2012194120 A | | 10/2012 |
| KR | 20010060933 A | | 7/2001 |
| KR | 20100127383 A | | 12/2010 |
| KR | 20110037497 A | | 4/2011 |
| KR | 20110054453 A | | 5/2011 |
| KR | 101233314 B1 | * | 2/2013 |
| KR | 101376076 B1 | | 3/2014 |
| KR | 101233314 B1 | | 2/2016 |
| RU | 2122246 C1 | | 11/1998 |

\* cited by examiner

POROUS COOLING BLOCK FOR COOLING CORIUM AND CORIUM COOLING APPARATUS INCLUDING SAME, AND CORIUM COOLING METHOD USING SAME

CROSS-REFERENCE TO RELATED APPLICATION

This application claims priority to and the benefit of Korean Patent Application No. 10-2014-0083596 filed in the Korean Intellectual Property Office on Jul. 4, 2014, the entire contents of which are incorporated herein by reference.

TECHNICAL FIELD

The present invention disclosed herein relates to a porous cooling block for cooling corium and corium cooling apparatus including the same and corium cooling method using the same, and more particularly, to a porous cooling block for cooling corium and corium cooling apparatus including the same and corium cooling method using the same capable of cooling corium with safety and rapidity with being applied to a variety of nuclear reactor facilities.

BACKGROUND ART

Generally, a nuclear power plant (NPP) carries out a producing function of electric energy to be able to be used in practical living using nuclear energy by controlling a plenty of energy occurred by nuclear fission to be released slowly.

Here, though the possibility of occurrence is very low, corium of ultra-high temperature with radioactive feature may be released into a cavity of primary reactor containment under a nuclear reactor container by nuclear fuel of reactor core being molten and breakdown of nuclear reactor container when a severe accident occurs at a nuclear power plant. At this situation, the corium released is a radioactive material with ultra-high temperature higher than 2000K, and has a feature that heat is occurred endlessly. And when fail to cooling the released corium properly, the primary reactor containment of nuclear reactor constructed as a concrete structure may be damaged by the corium of ultra-high temperature and radioactive material may leak outside. In case that radioactive material being leaked from the primary reactor containment of nuclear reactor like this is released to soil or atmosphere, it may not only become a threat to a stability of the nuclear power plant facilities, of course become a pollution to the surrounding environment of the nuclear power plant, but also may cause a critical harmful influence to the health of ordinary general public.

Thus, recent nuclear power plant applies or develops a method for cooling and controlling properly the corium in the primary reactor containment of nuclear power plant in order not to leak the corium outside of the primary reactor containment of nuclear power plant. That is, a method of capable of cooling the corium with ease is required since the corium of high temperature released from a nuclear reactor container to a cavity pore of the primary reactor containment of nuclear power plant may melt and erode the floor concrete of the primary reactor containment of nuclear power plant if not cooled properly.

At this time, the cooling of released corium is divided upper portion cooling and lower portion cooling of the corium. Since a damage of floor concrete occurs by contact of lower portion of corium, a lower portion cooling of the corium is required. For this lower portion cooling of the corium, an indirect cooling method in which cooling is performed at a state a cooling-water and the corium are not in contact using a cooling container, a direct cooling method in which cooling is performed at a state a cooling-water and the corium are directly in contact, etc. may be applied.

Among this, the direct cooling method can get a more increased cooling efficiency than that of indirect cooling method since it cools directly the corium by contacting the corium and cooling-water, and has a merit of requiring less installation space. Thus, a development of a corium cooling apparatus is wanted with easy installation for application not only to a new nuclear power plant but also to a running nuclear power plant and capable of maximization of cooling efficiency.

DISCLOSURE

Technical Problem

The present invention is to provide a porous cooling block for cooling corium and a corium cooling apparatus having the same and a corium cooling method using the same capable of increasing the safety of nuclear power plant by cooling the corium of high temperature released from the container of nuclear power plant with ease at an occurrence of significant accident of the nuclear power plant.

The present invention is to provide a porous cooling block for cooling corium and a corium cooling apparatus having the same and a corium cooling method using the same capable of application not only to a new nuclear power plant but also to a running nuclear power plant where the installation space is limited since any extension for installation space is required and with easy installation of cooling apparatus.

The present invention is to provide a porous cooling block for cooling corium and a corium cooling apparatus having the same and a corium cooling method using the same with increased easiness of production and construction by forming a natural circulation in a stacked structure of block type and with easy maintenance.

Technical Solution

A porous cooling block for cooling corium according to an embodiment of the present invention comprises a base part comprising one surface, an other surface facing the one surface, and a side surface connecting the one surface and the other surface each other, and including a plurality of pores, and a channel part formed open on at least one surface of the one surface, the other surface and the side surface and communicating with the plurality of pores.

The channel part comprises a first channel formed to extend inward direction from one surface of either the one surface or the other surface of the base part, and a second channel passing through the side surface of the base part and communicating with the first channel.

The second channel is provided in plurality in a way to pass through the side surfaces in one direction and another direction, and the plurality of the second channels may communicate with one another with being formed to cross in the base part.

The first channel may comprise a first hole formed open on a surface of either the one surface and the other surface, and a first flow path connected to the first hole to form a path toward inside of the base part.

The second channel may comprise a pair of second hole formed open to the side surface, and a second flow path connecting the second holes to form a path inside of the base part and communicating with the first channel.

An average cross-sectional area of the first channel may be smaller than that of the second channel and larger than that of the plurality of pores.

A corium cooling apparatus according to an embodiment of the present invention comprises a plurality of porous cooling blocks arranged to align with one direction and another direction crossing the one direction to form a plane, a sacrificial part received safely on the plurality of porous cooling block and covering an exposed upper surface of the porous cooling blocks, and a cooling-water supply unit for supplying cooling-water to the porous cooling blocks.

Each of the plurality of porous cooling blocks may be arranged to be able to separate from an aligned and arranged region.

The porous cooling block may include any one of above mentioned features.

The sacrificial part may comprise a separation member covering the porous cooling block, and a sacrificial member received safely on the separation member, and at least one member of the separation member and the sacrificial member may be provided being divided in plurality and may be aligned and stacked in order on the plane.

On a side surface of the porous cooling block, a side surface separation member may be arranged which is arranged on the most outside edge of a width formed by the plane.

The separation member may provide a sealed space for sealing the porous cooling block.

The cooling-water supply unit may comprise a cooling-water storage storing cooling-water supplied to the porous cooling block, and a cooling-water passing pipe whose one end is connected to the cooling-water storage and another end communicates with the porous cooling block.

A corium cooling method according to an embodiment of the present invention comprises detecting an occurrence of disorder by release of corium, supplying cooling-water to a plurality of porous cooling block at the same time when the corium melts a sacrificial part, and cooling the corium by discharging the cooling-water from the porous cooling block.

The sacrificial part may lower a thermal load per unit volume of the corium and may have the corium be distributed over an upper surface of the sacrificial part.

The cooling the corium may comprise generating steam by heat transfer of the corium and the cooling-water, and cooling the corium to the shape of a porous form by jetting the steam or the cooling-water toward the corium.

The porous cooling block may include any one of above mentioned features.

Advantageous Effects

According to a porous cooling block for cooling corium and a corium cooling apparatus having the same and a corium cooling method using the same of the present invention, corium of high temperature can be cooled with safety and ease, thereby corium of high temperature is prevented from being released outside of the primary reaction containment of nuclear power plant. That is, porous cooling block is provided in plurality which can endure the temperature delivered from the corium released from a container of nuclear power plant due to an occurrence of significant accident. And cooling-water flow path formed on each of the plurality of porous cooling blocks is fabricated to communicate with each other. Thus, the cooling-water can be supplied to the one surface forming the cooling block uniformly on the whole, which can cool the corium with ease to solidify it in the shape of a porous form.

And, the porous cooling block is fabricated by the unit of a plurality of brick structure and arranged to align with a position at which the corium may be released. Thus, it can be fabricated in a factory and a block of uniform quality may be obtained. And it may be assembled at a field which enhances the easiness of construction. Thus, fabrication and installation is easy to be applied and used to a running nuclear power plant facility with ease. And when maintenance is needed, a cooling block of needed region can be replaced which facilitates easy maintenance and short required time, which leads to a reduction in maintenance cost. This short installation and maintenance time due to easiness of construction and maintenance may minimize the exposure of a worker to radioactive ray and may reduce the cost of operator of nuclear power plant.

And, a small vertical channel is formed on the one surface in the porous cooling block facing the corium. Thus, the steam jetted through the channel pushes the corium and penetrate into the corium to cool it rapidly and solidify it in the shape of a porous form. Here, the small vertical channel can secure an enough cooling flow path even when any floating matter like dregs capable of occurring with the corium being cooled and solidified may stop up a pore formed at the cooling block.

And, a supply unit of cooling-water is fabricated to be connected to a porous cooling block directly when installed to a new nuclear power plant facility. Thus, the porous cooling block can be installed as a complete sealing structure in a accommodation space. Thus, an installation as a high level passive facility may be possible which does not require any active facilities such as outer power supply, action of operator, valve and pump etc. even at the time of severe accident.

BEST MODE

Hereinafter, a desirable embodiment of a porous cooling block for cooling corium and a corium cooling apparatus having the same and a corium cooling method using the same of the present invention may be described in reference to accompanying drawings.

A melt cooling apparatus according to an embodiment of the present invention is an apparatus of blocking the discharge of the melt outward from the accommodating space by cooling the melt within the accommodating space with ease when a melt of high temperature is released from a container arranged in facilities forming an accommodating space of a predetermined size. It includes a cooling block of porous and can reduce the temperature of the melt by supplying a cooling medium to the melt contacting to the cooling block with ease.

Thus, the present invention may be used to cool the corium with equipped at a position where the corium is released from the nuclear reactor container in a nuclear reactor facility having a primary reactor containment of nuclear reactor forming a space arranged for nuclear reactor container. However, the usage of the porous cooling block and the melt cooling apparatus having the same may not be limited this, and it may be used to a variety of facilities for suppressing or preventing a thermal damage of the facilities by a melt of high temperature.

That is, the melt in the present invention may be corium, and the container accommodating the melt may be a nuclear reactor container. And, the thing forming an accommodating space of a predetermined size may be a primary reactor containment of nuclear reactor. Thus, the terminologies described above may be used in a mixed sense which means the same meaning.

Hereinafter, a porous cooling block and a corium cooling apparatus having the same according to an embodiment of the present invention will be described in reference to FIG. 1 to FIG. 6.

Figure 1:
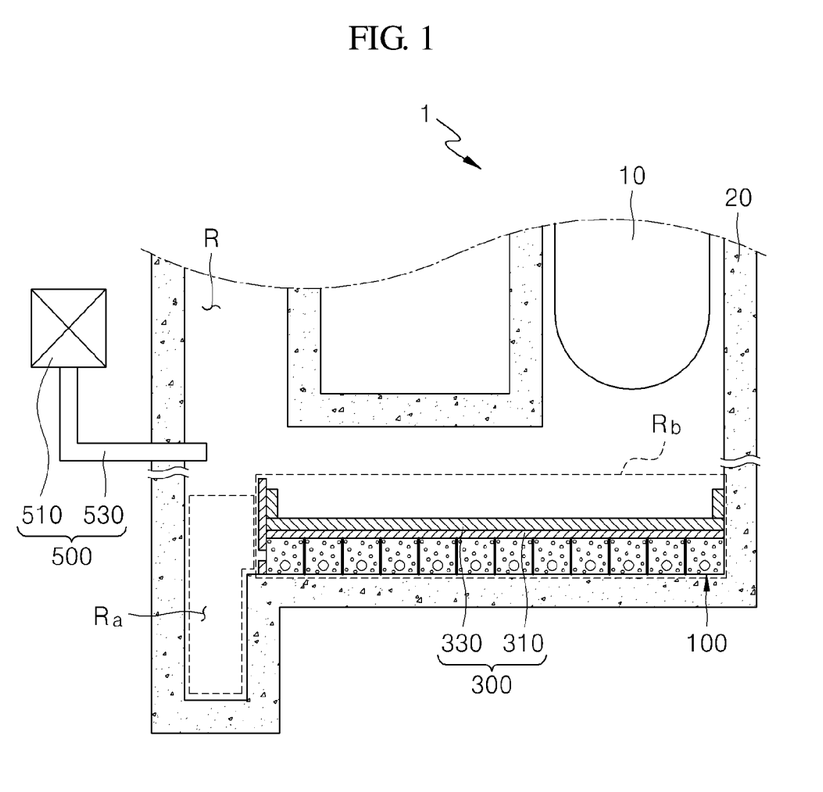
FIG. 1 is a schematic diagram showing a nuclear reactor facility equipped with a corium cooling apparatus according to an embodiment of the present invention.
Figure 2:
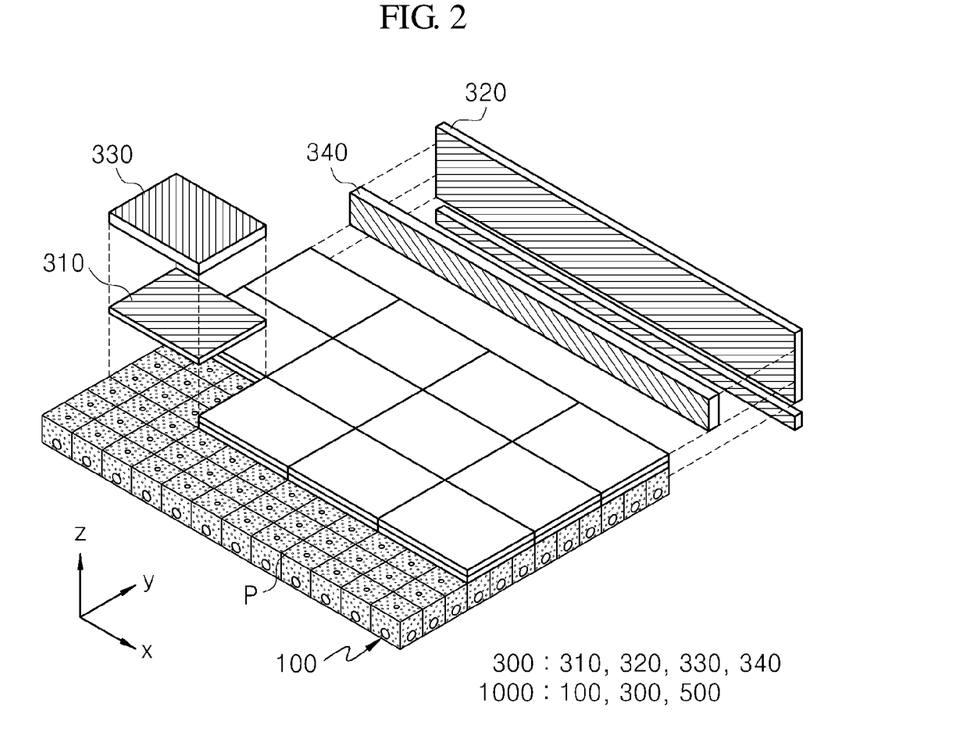
FIG. 2 is a perspective view illustrated selectively of a corium cooling apparatus according to an embodiment of the present invention.
Figure 3:
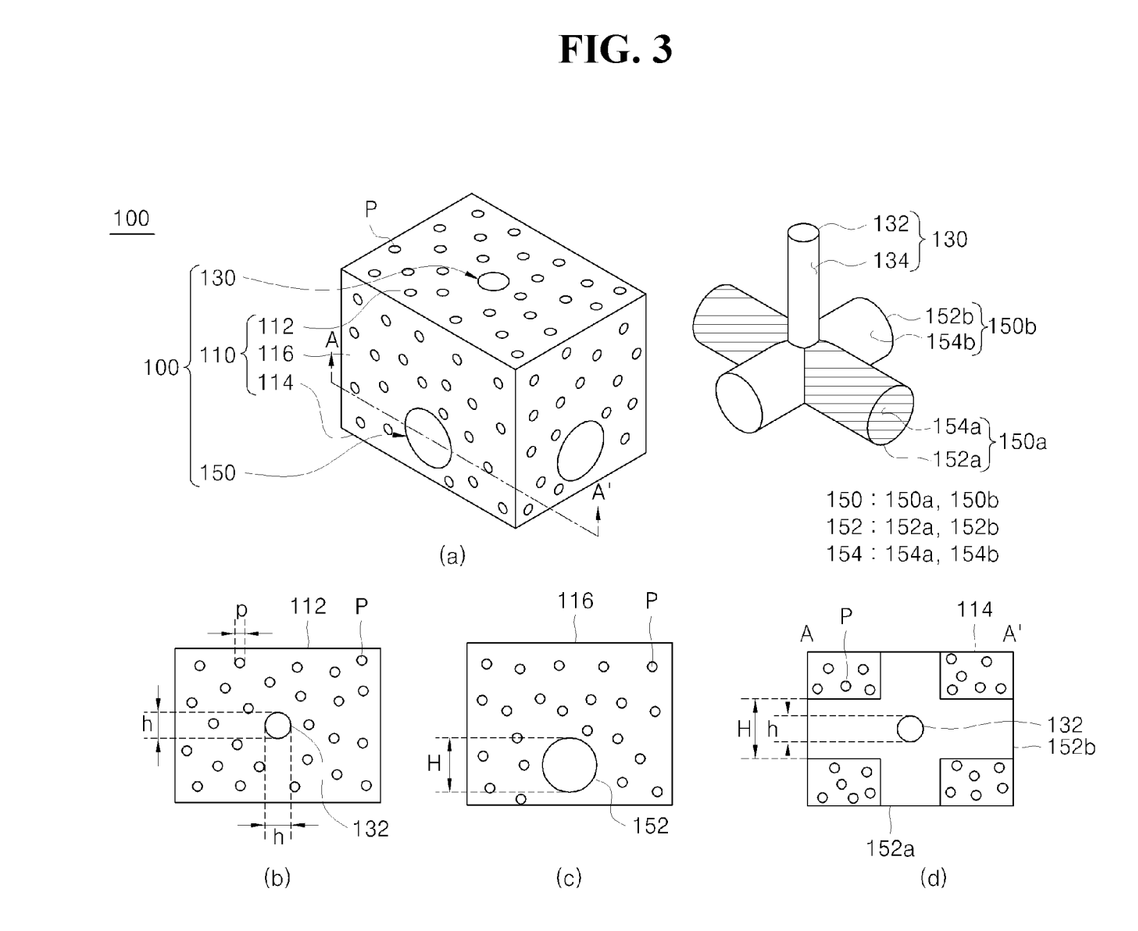
FIG. 3 is a drawing for description of a porous cooling block according to an embodiment of the present invention.
Figure 4:
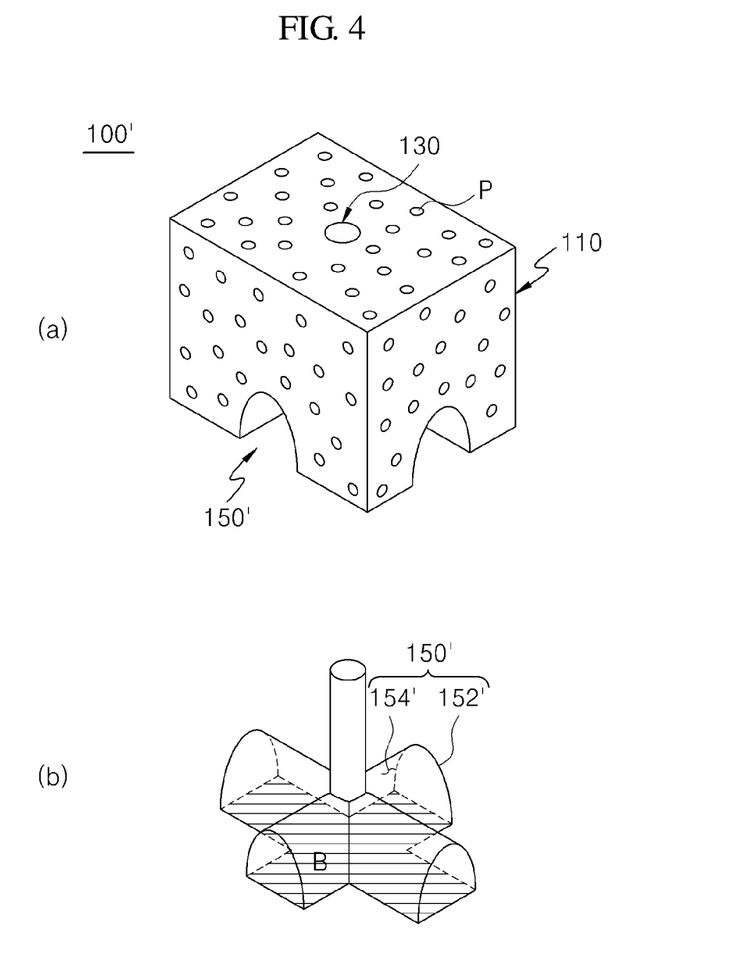
FIG. 4 is a drawing for description of a porous cooling block according to a varied embodiment of the present invention.
Figure 5:
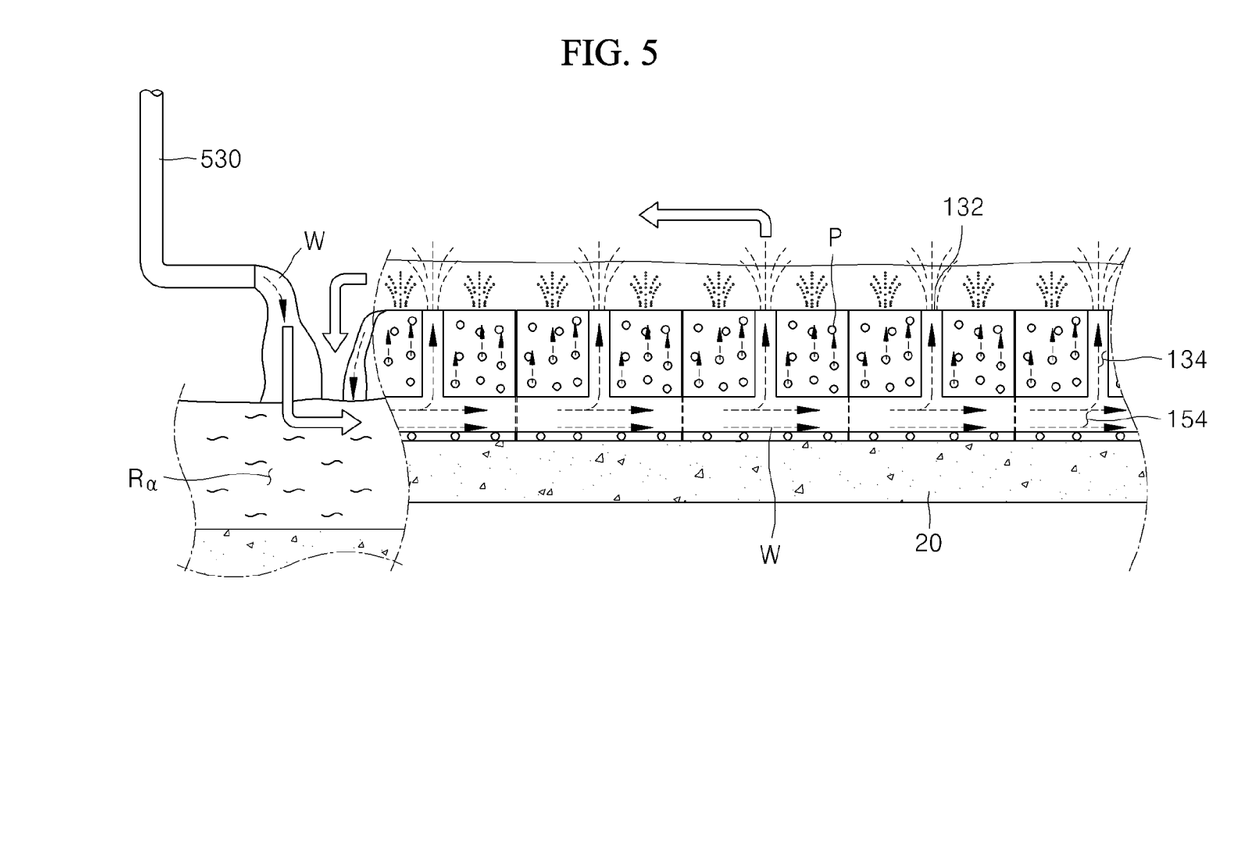
FIG. 5 is a drawing for description of charging-water status of the porous cooling block and a circulation status of cooling-water illustrated in FIG. 3.
Figure 6:
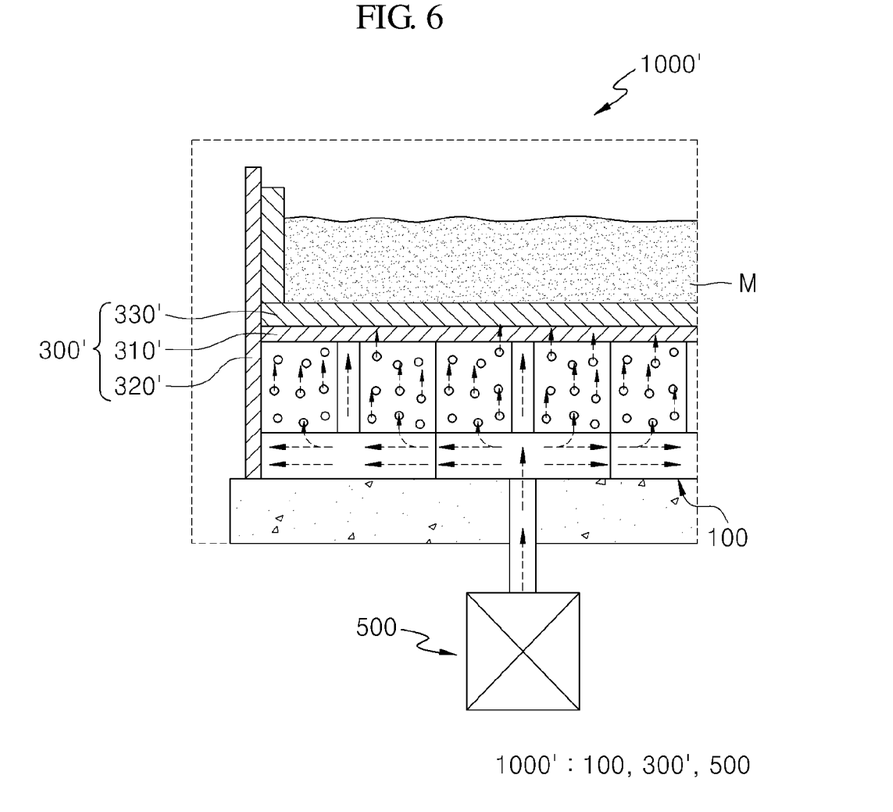
FIG. 6 is a drawing for description of installation status of the corium cooling apparatus according to a varied embodiment of the present invention.

FIG. 1 is a schematic diagram showing a nuclear reactor facility equipped with a corium cooling apparatus according to an embodiment of the present invention. FIG. 2 is a perspective view illustrated selectively of a corium cooling apparatus according to an embodiment of the present invention. FIG. 3 is a drawing for description of a porous cooling block according to an embodiment of the present invention. Here, FIG. 3($a$) is a perspective view showing the porous cooling block and inner waterway. FIG. 3($b$) to ($d$) are multi-side view of the porous cooling block. FIG. 4 is a drawing for description of a porous cooling block according to a varied embodiment of the present invention. FIG. 5 is a drawing for description of charging-water status of the porous cooling block and a circulation status of cooling-water illustrated in FIG. 3. FIG. 6 is a drawing for description of installation status of the corium cooling apparatus according to a varied embodiment of the present invention.

Referring to FIG. 1 and FIG. 2, a melt cooling apparatus 1000 according to the present invention may be installed at a lower portion cavity under a nuclear reactor container 10, for cooling the corium M released through a damaged part of the nuclear reactor container and preventing a mutual reaction of corium M and primary reactor containment of nuclear reactor at an occurrence of severe accident at a nuclear power plant. That is, at least a portion of the configuration of the melt cooling apparatus 1000 may be arranged at a structure partition of accommodating space R isolated from lower part of nuclear reactor container on the accommodating space R forming the primary reactor containment. At this time, the melt cooling apparatus 1000 forms a plane of predetermined size by being arranged to align to one direction, X axis direction and another direction, Y axis direction crossing the one direction, X axis direction at an isolated position from the lower part of the nuclear reactor container 10. It comprises a plurality of porous cooling block 100 including a channel part 130, 150 communicating with at least d portion of a plurality of pore P, a sacrificial part 300 received safely on the plurality of porous cooling block 100 and covering an exposed upper surface of the porous cooling blocks 100, and a cooling-water supply unit 500 for supplying cooling-water W to the porous cooling block 100.

The accommodating space R provides a space in which the nuclear reactor container 10 and provides a region to which a cooling-water W is supplied. For example, the accommodating space R is made of a plurality of partitions arranged to be isolated to outside of the nuclear reactor container 10 and may be a primary reactor containment 20. This is a space formed to prevent a radioactive material exceeding a permitted amount from being discharged over a managed region to an environment such as soil or atmosphere at the time of accident of nuclear reactor. The nuclear reactor container 10 and some elements of the melt cooling apparatus 1000 may be arranged inside. Such an accommodating space R may be divided into a cooling part $R_b$ at which some configurations of cooling apparatus 1000 for cool the corium M released from a damaged part of the nuclear reactor container 10 and dropped downward, and a storage Ra accommodating a predetermined amount of cooling-water W for injection of cooling-water W to the porous cooling block 100 described later from outside region of the cooling part $R_b$. However, the accommodating space R is not limited to the separation region, and may provide a sealing part additionally according to a varied embodiment described later.

Referring to FIG. 3, the porous cooling block 100 is arranged at a position isolated from a lower part of the nuclear reactor container 10. More particularly, it is arranged to align on a floor structure facing the lower part of the nuclear reactor container 10 among partitions configuring the accommodating space R. The porous cooling block 100 is provided to cool the corium M by supplying the cooling-water to the corium M released from the nuclear reactor container 10 at the time of occurrence of severe accident at a nuclear reactor facility. Such a porous cooling block 100 comprises a base part 110 comprising one surface 112, an other surface 114 facing the one surface 112, and a side surface 116 connecting the one surface 112 and the other surface 114 each other, and including a plurality of pores P, and a channel part 130, 150 formed open to at least any one surface of the one surface 112, the other surface 114 and the side surface 116 and communicating with at least some of the plurality of pores P. Here, as shown in FIG. 2, porous cooling block 100 is a block structure of predetermined size. And by a plurality of it being arranged to align to one direction, X axis direction and another direction, Y axis direction, it may form a plane having a predetermined size, that is area, in the one direction, X axis direction and the other direction, Y axis direction and it may be arranged to be able to be separated on the floor structure facing the lower part of nuclear reactor container 10.

The base part 110 is a basic structure to form a body of the porous cooling block 100, and comprises one surface 112, an other surface 114 facing the one surface 112, and a side surface 116 connecting the one surface 112 and the other surface 114 each other and a plurality of pores P. That is, the base part 110 is fabricated as a brick of a predetermined size, and the plurality of pores P are formed thereon to deliver the cooling-water with ease inside by communicating various path each other.

As described above, the base part 110 may be made of porous concrete or a ceramic material of high-temperature. Here, in case the base part 110 is fabricated with the former porous concrete, a base part 110 of block shape can be formed by pouring concrete into a mold of predetermined size and solidifying it. Thus, the base part 110 can be formed in a simple way. However, high-temperature strength of concrete is weak, and damage may occur at concrete by release weight of the corium M or falling weight of damaged part of nuclear reactor container 20. And a problem of being molten by the corium M during cooling process of the corium M may occur.

On the other hand, in case the base part 110 is fabricated with a latter ceramic material of high-temperature, a material having excellent high-temperature strength such as high-purity aluminum oxide ($Al_2O_3$) of melting point of 2072° C., silicon carbide (SiC) of melting point of 2730° C., silicon nitride ($Si_3N_4$) of melting point of 1900° C. and zirconium oxide ($ZrO_2$) of melting point of 2715° C. may be used as a ceramic material of high-temperature. During fabrication of the base part 110, by applying compressing pressure to the base part 110 in a strength to form pore P, the base part 110 can be fabricated to have the plurality of pores P. Here, in case of too low pressure, the base part 110 cannot show enough mechanical strength. Thus, the compressing power for fabrication of the base part 110 should be a value to endure the corium M of high-temperature and to have strength not to be broken when contacting each other at the time of arrangement to align the plurality of base parts 110. By fabrication of the base part 110 using ceramic material of high-temperature like this, more increased thermal stability and structural strength can be realized than by the case of the base part 110 using porous concrete.

As described above, the base part 110 may be fabricated with selection from the above-mentioned materials, and more particularly, may be applied and used according to temperature and design weight of the corium M.

The channel part 130, 150 is formed open to any one surface of the one surface 112, the other surface 114 and the side surface 116 forming the base part 110, and it communicates with at least a portion of a plurality of pores P formed on the base part 110. Thus, the channel part 130, 150 is provided to discharge the cooking-water W from the base part 110 with ease. That is, the channel part 130, 150 communicates with some of pores P of the base part 110, and is provided to discharge the cooling-water W with ease than in the case of the cooling-water being discharged through pore P from the base part 110. Thus, the channel part 130, 150 comprises a first channel 130 formed to extend inward from any one surface of the one surface 112 and the other surface 114 of the base part 110, and a second channel 150 passing through the side surface of the base part 110 and communicating with the first channel 130.

The first channel 130 is provided to discharge the cooling-water W to an upper surface of the base part 110, and comprises a first hole 132 formed open to any one surface of the one surface 112 and the other surface 114 of the base part 110 facing the nuclear reactor container 10, and a first flow path 134 forming a path inward direction of the base part 110 with being connected to the first hole 132. That is, the first channel 130 is formed to discharge the cooling-water W to upward with ease than in the case discharging the cooling-water W through pore P. And as shown in FIG. 3, it can be formed to have average diameter of h larger than the average diameter p of one pore P in case of forming the path in circular shape, and it can be formed to have average cross-sectional area larger than that for the plurality of pores P in case of forming the path in non-circular shape. Here, the average cross-sectional area means an average cross-sectional area for one pore P, and it means that an average cross-sectional area of each of the plurality of pores P have smaller average cross-sectional area to the average cross-sectional area of the first channel 130. And, the first channel 130 can perform a function for minimizing the flow path loss of the cooling-water W, even in case some pore P are stopped up by dregs like a floating matter which can be occurred at the time of melting sacrificial member 330 described later and cooling the corium M. The direction of extension formation of the first channel 130 like this is inward direction of the base part 110 to form to extend to the depth communicating with the second channel 150 flowing in the cooling-water W. The shape is shown as circular holes from which the flow path is formed, but the shape of the first channel 130 is not limited to this and the size can be formed variously.

The second channel 150 is formed to passing through the side surface of the base part 110 to flow in the cooling-water W into the porous cooling block 100, and may comprise a pair of second holes 152a and 152b, or collectively 152, communicating with at least some pores P and the first channel 130 formed on the base part 110, being provided to deliver the cooling-water W to the pore P and the first channel 130 and formed open to the side surface, and a pair 154 of second flow paths 154a and 154b, or collectively 154, forming path inside of the base part 110 by connecting the second hole and communicating with the first flow path 134. Here, in an embodiment of the present invention, to facilitate an easy supply of the cooling-water W to the plurality of porous cooling blocks 100 arranged to align in one direction and in the other direction, a pair of second channel is provided on the base part 110. The second channel 150 may comprise a pair of second channels 150a and 150b, which can cross each other in the base part 110 to form to communicate each other. That is, while one of the second channel 150 is formed to pass through two side surfaces facing each other among the side surfaces 116 of the base part 110, the other of the second channels 150a and 150b may be formed to pass through two side surfaces facing each other among the rest of the side surfaces 116 of the base part 110 and communicate each other. In case a pair of the second channels 150a and 150b are provided and formed per the base part 110 like this, the second channels 150a and 150b formed respectively on the porous cooling block 100 arranged to align to the one direction and the other direction, may communicate each other in the one direction and the other direction, by which the cooling-water W can move along the second channel 150 uniformly with ease to enable a uniform supply of the cooling-water W.

Here, in case the second channel 150 is formed in a circular form to supply the cooling-water W to the plurality of base part 110, the average diameter H can be formed as larger size than the average diameter h of the first channel 130 described above, and in case in non-circular form, it can be formed to have an average cross-sectional area increased than that of the first channel 130.

As described above, referring to FIG. 3(d) of plane view shown from a lower direction showing A-A' cross-section of the first channel 130 and the second channel 150, a moving path of the cooling-water W is formed to communicate with each other in the base part 110, thus the cooling-water W can move with ease in the base part 110 to the side surface side and the upper surface side. Moreover, in case the plurality of porous cooling blocks 100 are arranged to align each other and the second channels 150 communicate each other formed on each of the porous cooling block 100, the cooling-water W can be delivered with ease via the flow path to enable an even supply of the cooling-water W.

On the other hand, porous cooling block 100 may be fabricated to be varied like the one shown in FIG. 4. In a porous cooling block 100 according to a varied embodiment of the present invention, the second channel 150' formed on the base part 110 is formed open to any one surface of the side surface facing each other, and the one surface 112 and the other surface 114 on which the first channel 130 is formed.

Referring to FIG. 4, the second channel 150' according to a varied embodiment is formed open to the other surface 114 of the base part 110 and at least a portion of the side surface 116 and the other surface 114 of the base part 110 may be formed open as shown hatched region of B in FIG. 4(*b*). In case the second channel 150' is formed as such, supplying the cooling-water W from a lower part is easy. And since the cooling-water W can be supplied through an increased flow path area than a case in which the cooling-water W is supplied only through the side surface, occurrence of a problem by a flowage resistance can be suppressed even when plenty of cooling-water W is flowed in. A detailed description according to a porous cooling block 100' of a varied embodiment as such can be described in relation to FIG. 6.

The porous cooling block 100, 100' of the present invention as such has an advantage that it can be installed to facilities with ease by making plane by being aligned to the one direction and the other direction in plurality. This has a merit that the structure of facilities and the formation method is simple and easy compared to a conventional one in which a concrete composite is constructed and cured to a predetermined height on a installation space, and then the cooling-water is supplied to the corium by flowing the cooling-water to the concrete composite to produce a structure for supplying the cooling-water.

The sacrificial part 300 is received safely on the plane configured by the porous cooling blocks 100, and may be provided to increase the required time of getting contact of the porous cooling block 100 and the corium M. More specifically, the sacrificial part 300 can react with the corium M firstly to secure a time to charge the cooling-water W to the porous cooling block 100 by the cooling-water supply unit 500 described later in case corium M is detected to be released from nuclear reactor container 10 by an occurrence of severe accident of nuclear reactor facilities. It comprises a separation member 310 received safely on the top part of the porous cooling block 100, and a sacrificial member 330 received safely on the top part of the separation member 310.

The separation member 310 is arranged on the porous cooling block 100 and is for separating the sacrificial member 330 and the porous cooling block 100. It can be provided as single or divided plurality, and can cover an exposed upper surface of the porous cooling block 100 by being aligned on the plane which the porous cooling block 100 forms. The separation member 310 may be constructed as a metal plate, and is provided to suppress or prevent the sacrificial member 330 of not solidified from entering into the pore P or the first channel 130 of the porous cooling block 100 to block up at the time of field construction of the sacrificial member 330 described later. Here, the separation member 310 has an advantage of simple installation since there is no need of sealing of the porous cooling block 100 with welding or any fixing member not shown. That is, the separation member 310 can cover the porous cooling block 100 in single configuration or divided configuration with being received safely on the porous cooling block 100 without any fixation. In case the separation member 310 has a divided configuration into plurality, separate maintenance of separation member 310 of desired region is possible at the time of maintenance, and in case it is installed in a running nuclear reactor facility, it has an advantage of easy installation compared to a case it is provided as single.

On the other hand, a side surface separation member 320 may be provided on the side surface of the porous cooling block 100 in a direction crossing the extension direction of the separation member 310. The side surface separation member 320 covers at least a partial region of the side surface of the porous cooling block 100 and may be formed to extend to a higher position than the porous cooling block 100. More specifically, the side surface separation member 320 may be provided to cover at least a part of opened one side of the porous cooling block 100 and to be formed to extend in a predetermined length toward the upper direction. The side surface separation member 320 may perform a function of pushing the porous cooling blocks 100 to reduce a separation distance among the plurality of porous cooling blocks, when the porous cooling block 100 is arranged on an opened side surface and is received safely on the floor part of the cooling part $R_b$. That is, it is arranged to contact to the most outer edge of the plane formed by the porous cooling block 100, and may perform a role of restricting the space on the partition occupied by the porous cooling block 100.

The sacrificial member 330 may be provided to be received safely on the separation member 310 and to be separated from the porous cooling block 100. It is provided to reduce the temperature firstly and to facilitate a feature of spread to the corium M on the plane when corium M is released from the upper part on occurrence of severe accident. That is, it reduces a thermal output power per unit volume of the corium M by the reaction with the corium M and can reduce the thermal load per unit volume of the corium M. Thus, it facilitates cooling by the cooling-water W discharged from the porous cooling block 100. And it reduces the viscosity of the corium by the reaction with the corium M and can enhance the spreading of the corium M. Thus, it can suppress or prevent a local thermal load from rising on the porous cooling block 100. And, the sacrificial member 330 can perform a role to secure the time needed to charge the cooling-water W in the porous cooling block 100 during reaction with the corium M.

The sacrificial member 330 may be provided on the separation member 310 with configured as single like the separation member 310, or may be provided in the same or similar number to the separation member 310 and arranged to be stacked on the top part of the separation member 310.

On the other hand, a side surface sacrificial member 340 may be provided on an inner surface of the side surface separation member 320 in a direction crossing the extending direction of the sacrificial member 330 and on a partition of primary reactor containment of nuclear reactor. The side surface sacrificial member 340 is provided at inner side of the side surface separation member 320. It may be provided to protect a part of region of side surface separation member 320 even though it does not react with the corium M. That is, a side surface sacrificial member 340 performs a role of pressing a pressure to the side surface of the porous cooling block 100. Separation among the plurality of the porous cooling blocks 100 may occur in case melting starts by high temperature before supply of the cooling-water W through the porous cooling block 100. It can suppress or prevent a problem from occurring that the cooling-water W do not move uniformly by the occurrence of separation at communication paths among the second channels 150 of each of the porous cooling blocks 100.

The sacrificial member 330 and the side surface sacrificial member 340 as such may be fabricated using a sacrificial concrete composite, and the composite is not limited but should be able to reduce the thermal output power and viscosity per unit volume of the corium M by reacting with the corium M. And it may be formed of a composite which can prevent recriticality of the corium M and can reduce the production amount or occurrence rate of hydrogen by reaction with the corium M.

The cooling-water supply unit 500 is a means for supplying the cooling-water W to the porous cooling block 100 with being connected to an accommodating space R. The top part of the porous cooling block 100 is exposed after melting the sacrificial part 300 with reaction of corium M of high temperature and the sacrificial part 300. That is, the corium M and the porous cooling block 100 contacts each other. At this time, the cooling-water W is supplied to prevent the corium M from being released to outside of the primary reactor containment 20 forming the accommodating space R by lowering the temperature of the corium M. The cooling-water supply unit 500 as such comprises a cooling-water storage 510 accommodating the cooling-water, and a cooling-water passing pipe 530 whose one end is connected to the cooling-water storage and another end communicates with the porous cooling block 100.

The cooling-water storage 510 is provided to accommodate and supply the cooling-water W to the porous cooling block 100. An apparatus capable of supplying the cooling-water W to the porous cooling block 100 continuously and repeatedly by a predetermined amount may be used. Here, in an embodiment of the present invention, the cooling-water W may be supplied to the storage Ra communicating with the second channel 150, to supply the cooling-water W through the second channel 150 of the most outer opened surface of the porous cooling block 100 in the accommodating space R. Here, the cooling-water W supplied from the cooling-water storage 510 is supplied in a state set at a predetermined low temperature and can cool the corium M of high temperature in a short time. And the cooling-water W supplied to the porous cooling block 100 and used to cool the corium M is accommodated again to the cooling-water storage 510 and is lowered to a predetermined temperature. And, the circulation rate of the cooling-water W may be increased by resupply the cooling-water W.

The cooling-water passing pipe 530 forms a moving path of the cooling-water W to supply the cooling-water W to the porous cooling block 100. Here in an embodiment, a path communicating with the accommodating space R and supplying a cooling medium to storage Ra is formed. Thus, the cooling-water passing pipe 530 is arranged for a predetermined region to be inserted from the cooling-water storage 510 provided at outside of the primary reactor containment 20 into the primary reactor containment 20, by which the cooling-water W can be supplied from the cooling-water storage 510 into the inside of the accommodating space R. Here, a sealing member for sealing not shown is provided between the cooling-water passing pipe 530 and the primary reactor containment 20. The cooling-water passing pipe 530 and the primary reactor containment 20 may be formed not to have a separation space therebetween.

Referring to FIG. 5, a brief description on the water charge status of the porous cooling block 100 using the cooling-water supply unit 500 will be given. The cooling-water W discharged from the cooling-water storage 510 to the accommodating space R through the cooling-water passing pipe 530 is charged in the storage Ra which is a space to communicate with the side surface of the porous cooling block 100 within the accommodating space R. That is, the cooling-water W is charged up to a height for the storage Ra and the porous cooling block 100 to communicating with each other, for the cooling-water W to flow in to the porous cooling block 100 arranged at a relatively high position compared to the storage Ra. And when the cooling-water W is charged up to on a similar or equal line or to higher position to the side surface of the porous cooling block 100, the cooling-water W is supplied in the porous cooling blocks 100 forming a plane through the second channels 150 communicating with each other of the plurality of the porous cooling block 100. The cooling-water W supplied as such is charged fully to the first channel 130, the second channel 150 and the plurality of pores P, and then is discharged to the top part of the porous cooling block 100 when the upper surface of the porous cooling block 100 is open. And, the discharged cooling-water W can be flowed in again to the storage Ra according to the discharged amount and recirculated and reused.

On the other hand, a method in which the cooling-water supply unit 500 supplies the cooling-water W to the accommodating space R and then the cooling-water W is flowed in the porous cooling block 100, that is, a method in which the cooling-water W being charged up to a predetermined amount in the storage Ra is diffused to be supplied to the porous cooling block 100 is described above. However, the method by which the cooling-water supply unit 500 is provided is not limited to the above method. It may be provided as a melt cooling apparatus 1000 of a varied embodiment described later. Thus, the cooling-water supply unit 500 may be provided at a region not disturbing a major configuration of the nuclear reactor facilities at a running nuclear reactor facility and newly produced nuclear reactor facilities, and may be formed in a variety of structure capable of supplying the cooling-water W to the porous cooling block 100.

Hereinafter, an installation status of a corium cooling apparatus 1000' according to a varied embodiment will be described with reference to FIG. 6. Here, FIG. 6 is a drawing for description on an installation status of a corium cooling apparatus according to a varied embodiment of the present invention.

Referring to FIG. 6, the melt cooling apparatus 1000' according to a varied embodiment of the present invention performs identical or similar role to the structure proposed in the melt cooling apparatus 1000 according to the above-mentioned embodiment, except that the sacrificial part 300' is positioned so as for the porous cooling block 100' to be provided to seal in the accommodating space R, and thus, the arranged position of the cooling-water supply unit 500 became different. Thus, the description on the porous cooling block 100 will be omitted hereinafter, but configuration and position of the sacrificial part 300' and the cooling-water supply unit 500 will be described.

The sacrificial part 300' comprises a separation member 310' forming a sealed space for covering and sealing the opened upper surface of the plurality of the porous cooling block 100 arranged to align, and a sacrificial member 330 received safely on the separation member 310'. Here, the separation member 310' seal and cover the opened upper surface of the porous cooling block 100' without open space aligned and arranged on the partition facing the nuclear reactor container 10, and suppress or prevent the porous cooling block 100' from communicating with outside. And, in a varied embodiment, by including a side surface separation member 320' not contacting to the partition of the primary reactor containment of the porous cooling block 100', and arranged to contact to an opened one side surface to be connected to the separation member 310', the porous cooling block 100' can be provided in a sealed status.

Here, the cooling-water supply unit 500 to supply the cooling-water to the porous cooling block 100' supplies the cooling-water to the sealed space in which the porous cooling block 100' is sealed. For this, the cooling-water passing pipe 530 may be provided to be buried in the partition structure in which the porous cooling block is arranged to align. That is, the cooling-water W can be supplied to the lower part of the porous cooling block 100' through the partition structure from the lower part of the partition structure for a part to be buried in the partition structure.

The cooling-water supply at a sealed space of the porous cooling block 100' as described above can be applied to a case wherein the burial of the cooling-water passing pipe 530 is easy as in new nuclear power plant. By supplying the cooling-water directly to the sealed space with arrangement of the porous cooling block 100' as a sealed structure as such, the cooling-water W may be charged to the plurality of the porous cooling blocks 100' fully always, or the water charging time required to charge may be minimized. That is, the cooling-water W is accommodated in a predetermined space, and then the cooling-water W is charged to the sealed porous cooling block 100. And, the sacrificial member 330' is eroded by the corium M on occurrence of severe accident of nuclear reactor facilities. Thus, when the separation member 310' is applied and opened, the cooling-water W is released naturally to the upper part of the porous cooling block 100' to achieve passive facilities. Here, during a normal operation of nuclear reactor facilities, the cooling-water W is charged in the porous cooling block 100' for a long time, which leads to decline in the quality of the cooling-water W, occurrence of impurity, erosion of the separation member 310' and the cooling-water passing pipe 530, and contamination of pores of the porous cooling block 100'. To prevent or suppress them, during normal operation of nuclear reactor facilities, operation may be done in the state of injection of corrosion inhibitor or a predetermined gas in the porous cooling block 100' and some of cooling-water passing pipe 530.

On the other hand, to the corium cooling apparatus 1000, a temperature detector may be provided which can detect the release of the corium M from the accommodating space R.

The temperature detector not shown is provided at least any one place of accommodating space R where the corium M is released and measures the temperature of the accommodating space R to be able to detect the occurrence of release of the corium M. More specifically, it is arranged at a position close to a point at which the corium M is released from the nuclear reactor container 10, or to a point at which the sacrificial part 300 and the porous cooling block 100 are arranged, and is able to measure the temperature of the accommodating space R. Here, the temperature detector is non-contact type which can measure the temperature at a separated place from the point where the corium is released, and a pyrometer may be used for it capable of measuring the temperature by detecting thermal energy.

And, a controller not shown to control the operation of the cooling-water supply unit 500 according to the result of temperature measurement of the temperature detector with being connected to the temperature detector may be provided to the corium cooling apparatus 1000.

The controller controls the operation of the cooling-water supply unit 500 according to the temperature inside the accommodating space measured by the temperature detector. More specifically, in case the temperature of the accommodating space R measured by the temperature detector is a value that is rapidly raised compared to the temperature of normal status, or the temperature when the corium is not released from the nuclear reactor container, the controller determines as there occurred a severe accident with release of corium M, and then have the cooling-water supply unit 500 operate to supply the cooling-water W to the porous cooling block 100. Here, the controller is a device capable of determining the occurrence of accident by being delivered with the temperature value and capable of delivering an operation signal to the cooling-water supply unit 500, and a device such as a PLC panel and PC can be used. However, the controller is not limited such, and various transferring device of measures of operator and various signal may be used for the same.

And, in case the temperature detector which is provided as in a varied embodiment 1000' of FIG. 6 and capable of detecting the occurrence of severe accident is not necessary, or active facilities having outer power supply or operator's action for the cooling-water supply unit 500 is not necessary, it may be used as passive facilities.

Figure 7:
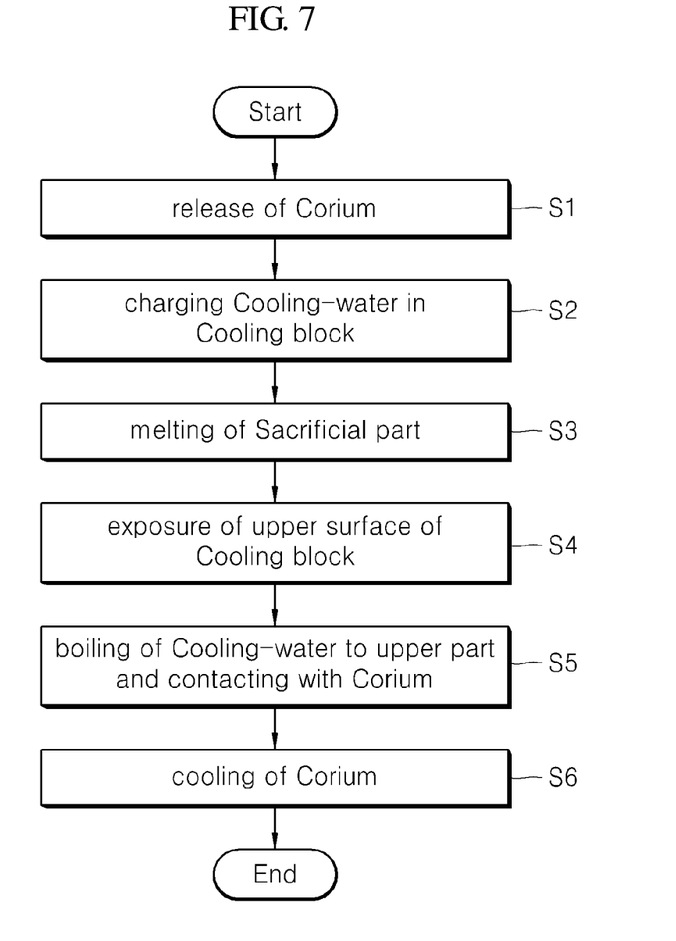
FIG. 7 is a flow chart showing in order a corium cooling method using the porous cooling block and the corium cooling apparatus according to an embodiment of the present invention.
Figure 8:
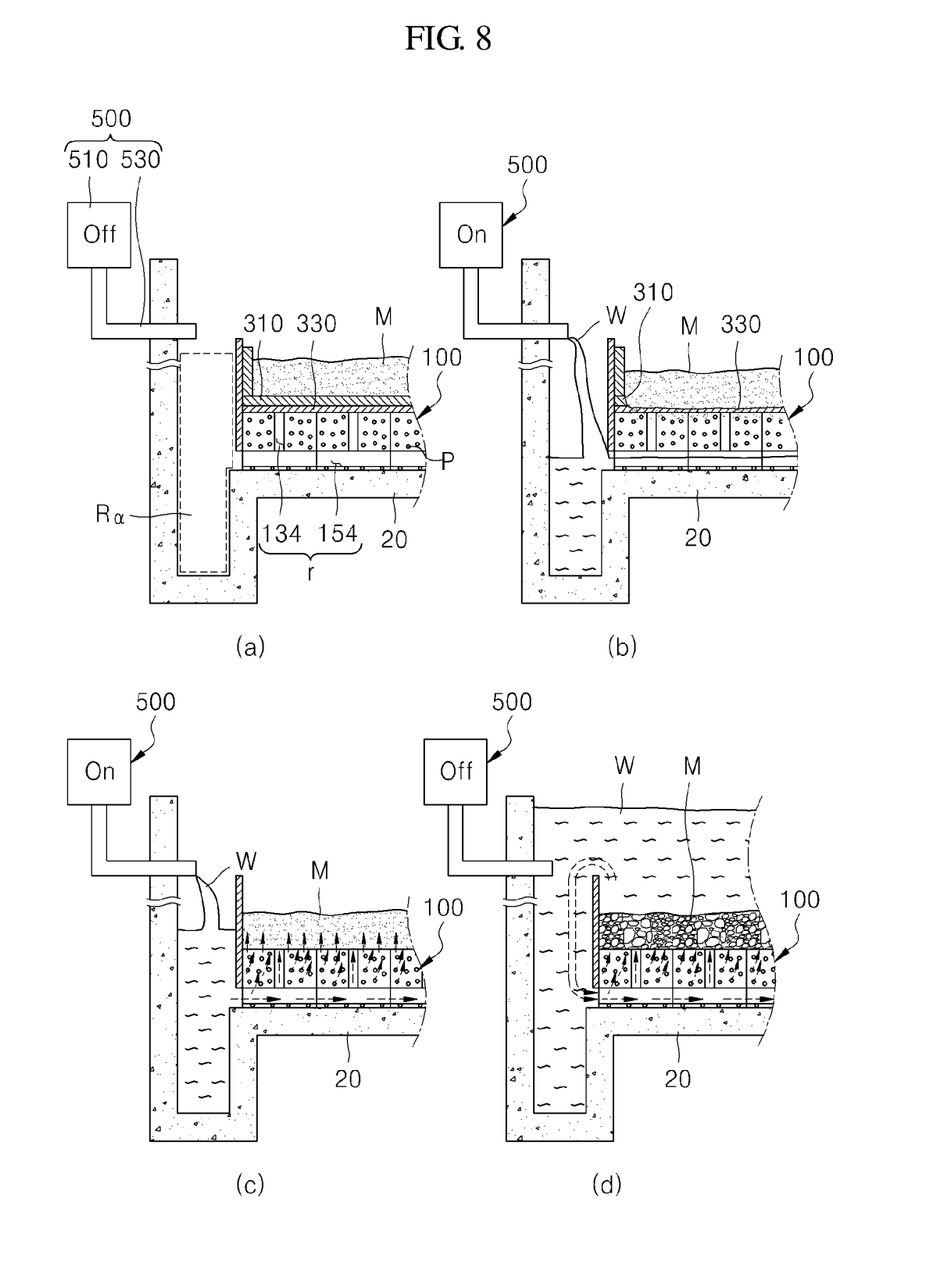
FIG. 8 is a process diagram showing the corium cooling method of FIG. 7.

A melt cooling method using the melt cooling apparatus 1000 fabricated and configured as mentioned above will be described in reference to FIG. 7 and FIG. 8. FIG. 7 is a flow chart showing in order the method of cooling the melt using the porous cooling block and the melt cooling apparatus according to an embodiment of the present invention. FIG. 8 is a process diagram showing a method of cooling melt of FIG. 7. Hereinafter, the corium cooling method will be described on the basis of porous cooling block and the melt cooling apparatus having the same of above mentioned embodiment, where the cooling method thereof will be applied to the varied embodiment the same.

Referring to FIG. 7 and FIG. 8, the melt cooling method according to the embodiment of the present invention comprises detecting an occurrence of severe accident by release of corium M, supplying cooling-water W to a plurality of porous cooling blocks 100 comprising a plurality of pores P, a first channel 130 and a second channel 150 each formed in upward direction and planar direction, at the same time when the corium M melts a sacrificial part 300, and cooling the corium M by discharging the cooling-water W through pore P and the first channel 130.

Even though not high possibility of occurrence, there is a possibility that corium M is released to lower part of nuclear reactor container 10 through a damaged part of nuclear reactor container 10 in case of occurrence of severe accident at nuclear power plant. The corium M is a melt material of high temperature mixed with enriched uranium of nuclear fuel of core of nuclear reactor installed inside of nuclear reactor container 10, zirconium used as clad material and many materials inside the nuclear reactor container 10. Cooling of the corium M is required since the corium M generates heat by decay of nuclear fission product inside. Thus, the released corium M reacts with floor concrete configuring the primary reactor containment 20 to generate plenty of non-condensable gas to melt and erode the floor.

Therefore, as shown in FIG. 8(*a*), it is detected that the corium M is released from the nuclear reactor container 10 and dropped into a inner space of the primary reactor containment 20 (S1). That is, a rapid increase of temperature in the accommodating space R is known by a temperature detector measuring the temperature of the accommodating space R in the primary reactor containment 20, and the occurrence of severe accident of release of the corium M from the nuclear reactor container 10 is verified.

When a release of the corium M is detected, the cooling-water is supplied to charge the cooling-water in the porous cooling block for cooling of the corium M (S2). That is, as shown in FIG. 8(b), to supply the cooling-water W to the second channel 150 passing through the side surface of the porous cooling block 100, the cooling-water is supplied to the storage Ra in the accommodating space R, the cooling-water W charged to a predetermined height in the storage Ra flows in the porous cooling block 100, and the cooling-water W is uniformly supplied to the plurality of blocks through the second channels 150 formed on each of the porous cooling block 100. On the other hand, during supply of cooling-water W, the process of melting and erosion of the corium M and the sacrificial part 300 arranged on the porous cooling block 100 is performed at the same time (S3). That is, at least before opening the porous cooling block 100 to the corium M by melting and erosion of the sacrificial part 300, charge of cooling-water W to upper part of the porous cooling block 100 or to an upper water level can be completed, or the charge completion of cooling-water W in the porous cooling block 100 and the melting and erosion of the sacrificial part 300 can be performed at the same time.

In the reaction process of the sacrificial part 300 and the corium M, firstly the sacrificial member 330 and the corium M which are arranged the most upper surface react each other and the sacrificial member 330 is molten. And then the separation member 310 which is arranged under part of the sacrificial member 330 and the corium M react each other and the separation member 310 is molten. Here, by the melting reaction of the sacrificial member 330 and the corium M, the thermal output power per unit volume of the corium M is reduced, and the viscosity of the corium M is reduced. As a result, the load in the process of cooling the corium M by the cooling-water W can be reduced. And with reduced viscosity, the corium M can be distributed on the plane formed by the sacrificial part 300 and the porous cooling block 100, by which the occurrence of local temperature increasing region by agglomerate of the corium M may be suppressed or prevented.

After the cooling-water W is charged (S2), the sacrificial part 300 is molten (S3). Then the upper surface of the porous cooling block 100 covered by the sacrificial part 300 is exposed (S4). That is, the corium M moves gradually toward the porous cooling block 100 as the sacrificial part 300 melts, and as shown in FIG. 8(c), the cooling-water W can contact directly to the corium M (S5) through the plurality of pores P and the first channel 130 which are open to the upper surface of the opened porous cooling block 100 to cool the corium M (S6).

Here, the cooling method of the corium M will be described in detail. The cooling-water W charged in the plurality of pore P and the first channel 130 which are vacancy in the porous cooling block 100 are boiled by heating of the corium M. That is, the cooling-water W is boiled and the steam pressure becomes larger than the pressure of circumstances. And the boiling occurs not only at the surface of the liquid but also inside to generate the steam rapidly and cools the corium M. After that, the melting and erosion of the sacrificial part 300 by continuous heating of the corium M is repeated, and when the cooling block 100 contacts with the corium M, the steam or cooling-water W in the cooling block 100 penetrates and jets into the corium M to cool the corium M. The cooled corium M is solidified in a shape of porous form, and then long-term cooling can be performed by natural circulation of the cooling-water W. In the present invention, the cooling-water W is boiled and directly contact to the lower part of the corium M to preform cooling. Moreover, in the long-term cooling when the corium M is solidified in a shape of porous form, the cooling-water W or steam is continuously discharged to the upper part through the pores P and the first channel 130, by which the corium M is enclosed and contact and cooling over the whole region, or upper part and lower part of the corium M can be performed. Therefore, the surface area of contact between the cooling-water W and the corium M can be increased and the cooling of the corium M can be performed with more ease. And a part of the cooling-water W discharged from the porous cooling block 100 is moved to the storage Ra again, and then the cooling-water W supplied once is recycled to be used again to cool the corium M.

As described above, the porous cooling block and the corium cooling apparatus having the same according to an embodiment of the present invention use a ceramic material of high temperature with increased resistivity on the melting by the temperature of the corium. By forming the porous block using the same and forming the plane with aligned state each other, it can be applied to various facilities including a nuclear reactor facility without limitation of facilities.

Here, a channel open to a space between the side surface and upper surface of the porous cooling block is formed, which facilitates easy delivery of the cooling-water among the plurality of the porous cooling block and the cooling-water can be supplied uniformly on the plane of the cooling block contacting the corium.

And the first channel formed open to the upper surface maintains the flow of the cooling-water, and even in the case some residue of the corium and the sacrificial member penetrate into the pore during recirculation of the cooling-water, it relaxes or prevents the reduction of cooling performance owing to the reduction of cooling flow path.

Although the present invention has been illustrated and described as to a desirable embodiment, the present invention is not limited by the above embodiment, and those ordinary skilled in the art may understand that variety of variation and equivalent other embodiment are possible within the scope of the present invention claimed.

Therefore, the range of technical protection of the present invention should be determined by the claim attached.

What is claimed is:
1. A porous cooling block for cooling corium, comprising:
a base part comprising a top surface, a bottom surface, and a plurality of side surfaces connecting the top surface and the bottom surface to each other, and including a plurality of pores; and
a channel part defining an opening on at least one surface among the top surface, the bottom surface and the plurality of side surfaces, and communicating with the plurality of pores,
wherein the channel part comprises:
a first channel formed to extend in an inward direction from one surface of either the top surface or the bottom surface of the base part; and
a second channel formed to pass through two side surfaces facing away from each other among the plurality of side surfaces of the base part, and communicating with the first channel,
wherein the first channel and the second channel provide a flow path of cooling-water in the base part.

2. The porous cooling block for cooling corium according to claim 1, wherein
the second channel is provided in plurality in a way to pass through two respective side surfaces in one direction and another direction, and
the plurality of the second channels communicate with one another by crossing in the base part.

3. The porous cooling block for cooling corium according to claim 1, the first channel comprising,
a first hole defining an opening on a surface of either the top surface and the bottom surface; and
a first flow path connected to the first hole to form a path toward inside of the base part.

4. The porous cooling block for cooling corium according to claim 1, the second channel comprising,
a pair of second holes defining an opening to the two side surfaces; and
a second flow path connecting the second holes to form a path inside of the base part and communicating with the first channel.

5. The porous cooling block for cooling corium according to claim 1, wherein an average cross-sectional area of the first channel is smaller than that of the second channel and larger than that of the plurality of pores.

6. A corium cooling apparatus, comprising:
a plurality of porous cooling blocks arranged to align with one direction and another direction crossing the one direction to form a plane, wherein at least one of the plurality of porous cooling blocks is a porous cooling block of claim 1;
a sacrificial part received safely on the plurality of porous cooling block and covering an exposed upper surface of the porous cooling blocks; and
a cooling-water supply unit for supplying cooling-water to the porous cooling blocks.

7. The corium cooling apparatus according to claim 6, wherein each of the plurality of porous cooling blocks is arranged to be able to separate from an aligned and arranged region.

8. The corium cooling apparatus according to claim 6, the sacrificial part comprising,
a separation member covering the porous cooling block; and
a sacrificial member received safely on the separation member, and
at least one member of the separation member and the sacrificial member is provided being divided in plurality and aligned and stacked in order on the plane.

9. The corium cooling apparatus according to claim 8, wherein, on a side surface of the porous cooling block, a side surface separation member is arranged which is arranged on the most outside edge of a width formed by the plane and covering at least a partial region of the side surface of the porous cooling block.

10. The corium cooling apparatus according to claim 8, wherein the separation member provides a sealed space for sealing the porous cooling block.

11. The corium cooling apparatus according to claim 6, the cooling-water supply unit comprising,
a cooling-water storage storing cooling-water supplied to the porous cooling block; and
a cooling-water passing pipe whose one end is connected to the cooling-water storage and another end communicates with the porous cooling block.

* * * * *